United States Patent
Mishra

(10) Patent No.: US 10,917,765 B2
(45) Date of Patent: Feb. 9, 2021

(54) CELLULAR TO V2X CERTIFICATION AND AUTHORIZATION

(71) Applicant: FORD GLOBAL TECHNOLOGIES, LLC, Dearborn, MI (US)

(72) Inventor: Anjali Mishra, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/047,184

(22) Filed: Jul. 27, 2018

(65) Prior Publication Data
US 2020/0037130 A1    Jan. 30, 2020

(51) Int. Cl.
| | |
|---|---|
| H04W 4/46 | (2018.01) |
| H04L 29/08 | (2006.01) |
| H04W 4/44 | (2018.01) |
| H04L 12/24 | (2006.01) |

(52) U.S. Cl.
CPC .......... H04W 4/46 (2018.02); H04L 41/0806 (2013.01); H04L 67/12 (2013.01); H04W 4/44 (2018.02)

(58) Field of Classification Search
CPC ....... H04W 4/46; H04W 4/44; H04W 12/003; H04W 12/0609; H04W 76/10; H04W 12/0051; H04W 12/06; H04L 41/0806; H04L 67/12; H04L 43/50
See application file for complete search history.

(56) References Cited

U.S. PATENT DOCUMENTS

| | | | |
|---|---|---|---|
| 2016/0065367 A1* | 3/2016 | Oshida | H04L 9/0869 370/329 |
| 2017/0310674 A1 | 10/2017 | Markham | |
| 2018/0075670 A1* | 3/2018 | Rajakondala | G07C 5/008 |
| 2018/0227155 A1* | 8/2018 | Khoryaev | H04L 27/2602 |

FOREIGN PATENT DOCUMENTS

DE    102015219517 A1    4/2017

OTHER PUBLICATIONS

3GPP TS 36.523-2 V15.2.0 (Jun. 2018). 3rd Generation Partnership Project; Technical Specification Group Radio Access Network; Evolved Universal Terrestrial Radio Access (E-UTRA) and Evolved Packet Core (EPC); User Equipment (UE) conformance specification; Part 2: Implementation Conformance Statement (ICS) proforma specification (Release 15).*

\* cited by examiner

*Primary Examiner* — Marcus Hammonds
(74) *Attorney, Agent, or Firm* — Michael J. Spenner; Brooks Kushman P.C.

(57) ABSTRACT

A vehicle includes a modem and a processor. The processor is programmed to provision the modem, over a local network connection, to perform vehicle-to-vehicle communications, the provisioning being performed independent of access to a cellular communications network, and once provisioned, communicate with a second vehicle over a direct vehicle-to-vehicle connection. The modem may be tested utilizing a Protocol Implementation Conformance Statement (PICS) separating test cases for use of a PC5 interface only, for use of a Uu interface only, and for a hybrid for use of Uu and PC5.

18 Claims, 5 Drawing Sheets

CELLULAR TO V2X CERTIFICATION AND AUTHORIZATION

TECHNICAL FIELD

Aspects of the disclosure generally relate to certification and authorization of cellular vehicle to X connections.

BACKGROUND

Vehicle-to-vehicle (V2V) communication refers to the wireless transmission of data between motor vehicles. V2V communications may be used for various purposes, including allowing vehicles to send messages to one other including status information regarding the operation of the vehicle. This information may include, for example, speed, location, direction of travel, braking, and stability data.

SUMMARY

In one or more illustrative examples, a vehicle includes a modem and a processor. The processor is programmed to provision the modem, over a local network connection, to perform vehicle-to-vehicle communications, the provisioning being performed independent of access to a cellular communications network, and once provisioned, communicate with a second vehicle over a direct vehicle-to-vehicle connection.

In one or more illustrative examples, a method includes provisioning a modem of a vehicle, over a local network connection, to perform vehicle-to-vehicle communications, the provisioning being performed independent of access to a cellular communications network, and once provisioned, communicating with a second vehicle over a direct vehicle-to-vehicle connection.

In one or more illustrative examples, a non-transitory computer readable medium includes instructions that, when executed by a processor of a controller of a vehicle including a modem, cause the controller to provision the modem, over a local network connection, to perform vehicle-to-vehicle communications, the provisioning being performed independent of access to a cellular communications network; and once provisioned, communicate with a second vehicle over a direct vehicle-to-vehicle connection.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
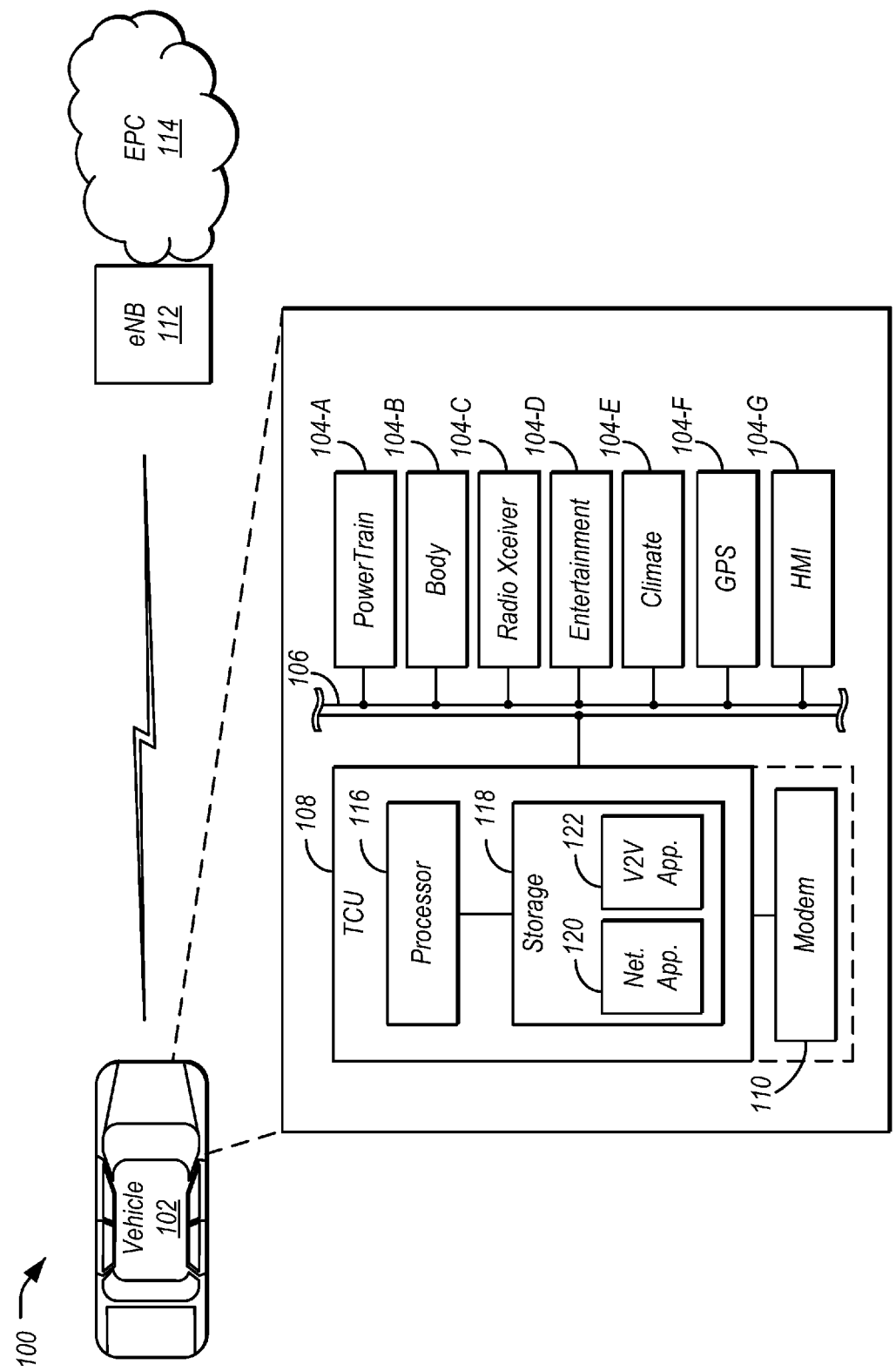
FIG. 1 illustrates an example system including a vehicle in communication over a 3GPP network.

FIG. 1 illustrates an example system 100 including a vehicle 102 in communication over a 3GPP network. As illustrated, the vehicle 102 includes a plurality of vehicle electronic control units (ECUs) 104 in communication over one or more vehicle buses 106. The vehicle 102 further includes a telematics control unit (TCU) 108 configured to send and receive data to networked devices connected to the 3GPP network. The TCU 108 may utilize a network application 120 installed to the TCU 108 to send and receive data over the 3GPP network. The TCU 108 may also use a V2V application 122 installed to the TCU 108 to send and receive data between vehicles 102, without using the 3GPP network. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors, and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle electronic control units (ECUs) 104, as well as between the TCU 108 and the vehicle ECUs 104. As some non-limiting examples, the vehicle bus 106 may include one or more of a vehicle controller area network (CAN), an Ethernet network, or a media oriented system transfer (MOST) network. Further aspects of the layout and number of vehicle buses 106 are discussed in further detail below.

The TCU 108 may include network hardware configured to facilitate connectivity between the vehicle ECUs 104 and devices connected to an outside network. To do so, the TCU 108 may include or otherwise access a cellular modem 110. (E.g., in some cases the modem 110 is internal to the TCU 108 while in other cases the modem 110 is external to the TCU 108.) As shown, a portion of a LTE network architecture is illustrated which may be referred to as an Evolved Packet System (EPS). The EPS may include an Evolved UMTS Terrestrial Radio Access Network (E-UTRAN), an Evolved Packet Core (EPC) 114, a Home Subscriber Server (HSS), or an Operator's IP Services. The EPS can interconnect with other access networks.

The E-UTRAN includes an evolved Node B (eNB) 112 which may be an example of a serving base station that serves the modem 110. The E-UTRAN also includes other eNBs 112 (not shown). The eNB 112 can provide user and control planes protocol terminations toward the modem 110. The eNB 112 may be connected to the other eNBs 112 via a backhaul (e.g., an X2 interface). The eNB 112 and other eNBs 112 may also be referred to as a base station, a base transceiver station, a radio base station, a radio transceiver, a transceiver function, a basic service set (BSS), an extended service set (ESS), or some other suitable terminology. The eNB 112 can provide an access point to the EPC 114 for the modem 110. The modem 110 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an user equipment, a mobile terminal, a wireless terminal, a remote terminal, a handset, a user agent, a mobile client, a client, or some other suitable terminology.

The eNB 112 is connected by an S1 interface to the EPC 114. The EPC 114 includes elements such as a Mobility Management Entity (MME), other MMEs, a Serving, and a Packet Data Network (PDN) Gateway. The MME is the control node that processes the signaling between the modem 110 and the EPC 114. Generally, the MME provides bearer and connection management. All user IP packets can be transferred through the Serving Gateway, which itself is connected to the PDN Gateway. The PDN Gateway can provide UE IP address allocation as well as other functions. The PDN Gateway is connected to the Operator's IP Services. The Operator's IP Services may include the Internet, the Intranet, an IP Multimedia Subsystem (IMS), and a PS Streaming Service (PSS).

The TCU 108 may further include various types of computing apparatus in support of performance of the functions of the TCU 108 described herein. In an example, the TCU 108 may include one or more processors 116 configured to execute computer instructions, and a storage 118 medium on which the computer-executable instructions and/or data may be maintained. A computer-readable storage medium (also referred to as a processor-readable medium or storage 118) includes any non-transitory (e.g., tangible) medium that participates in providing data (e.g., instructions) that may be read by a computer (e.g., by the processor (s)). In general, the processor 116 receives instructions and/or data, e.g., from the storage 118, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of DTC data and/or other vehicle information from the vehicle ECUs 104 connected to the one or more vehicle buses 106.

The network application 120 may be one application included on the storage 118 of the TCU 108. The network application 120 may include instructions that, when executed by the processor 116 of the TCU 108 allows the vehicle 102 to communicate data via the EPC 114.

The V2V application 122 may be another application included on the storage 118 of the TCU 108. The V2V application 122 may include instructions that, when executed by the processor 116 of the TCU 108 allows the vehicle 102 to communicate with other vehicles 102 directly, without the data being transmitted over the EPC 114.

For cellular vehicle-to-anything (C-V2X) communications, a vehicle telematics control unit (TCU) can communicate with other vehicles in various ways per the 3GPP standards. Currently, 3GPP includes several scenarios that require the cellular network for vehicle-to-vehicle (V2V) authentication. However, it is desirable for a vehicle 102 to avoid reliance on the presence of a cellular network to authenticate for V2V communications. Instead of using cellular, authentication of a vehicle 102 for V2V communication may be performed through another mechanism (e.g., at a dealership), where once authenticated, the vehicle 102 may then speak to other vehicles 102 directly without involvement from the EPC 114 or the rest of the cellular network. This can be done periodically, with periodicity up to infinity.

Figure 2A:
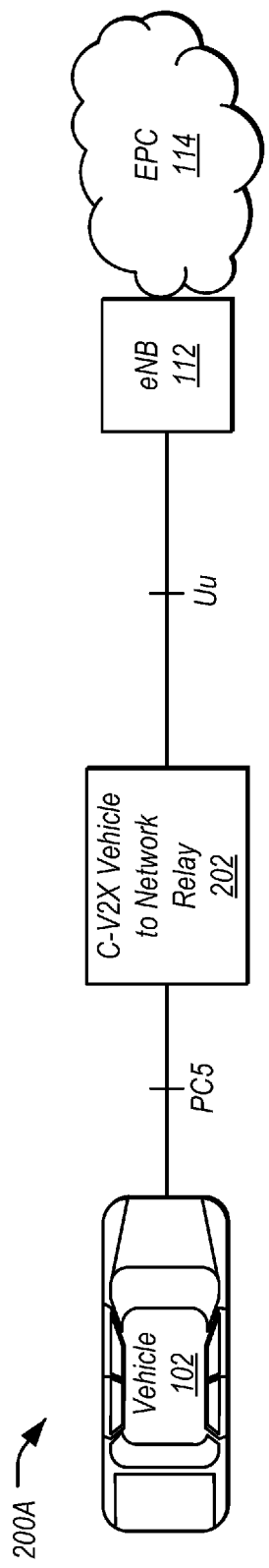
FIG. 2A illustrates an example network diagram in which a 3GPP network is indirectly used by a vehicle in C-V2X communication.

FIG. 2A illustrates an example network diagram 200A in which a 3GPP network is indirectly used by a vehicle 102 in C-V2X communication. As shown in the diagram 200A, the vehicle 102 is in communication with a C-V2X vehicle-to-network relay 202 over a PC5 interface. The network relay 202 in turn is in communication with an eNB 112 over a Uu interface, where the eNB 112 is a gateway to an EPC 114. Thus, it can be seen that the use by the vehicle 102 of the C-V2X Vehicle to network relay 202 results in indirect use of the EPC 114 of the 3GPP network. Hence, even though the C-V2X modem 110 in the vehicle 102 sees only a PC5 (physical channel) interface, there is a requirement of the vehicle 102 for use of the underlying 3GPP network, which is controlling the C-V2X communication. This poses issues with 3GPP certified modems that they may fail to perform C-V2X communication in the absence of an available 3GPP network. Further aspects of use of the relay 202 are described in detail in 3GPP technical specification TS 23.303, titled "Proximity-based services (ProSe); Stage 2."

Figure 2B:
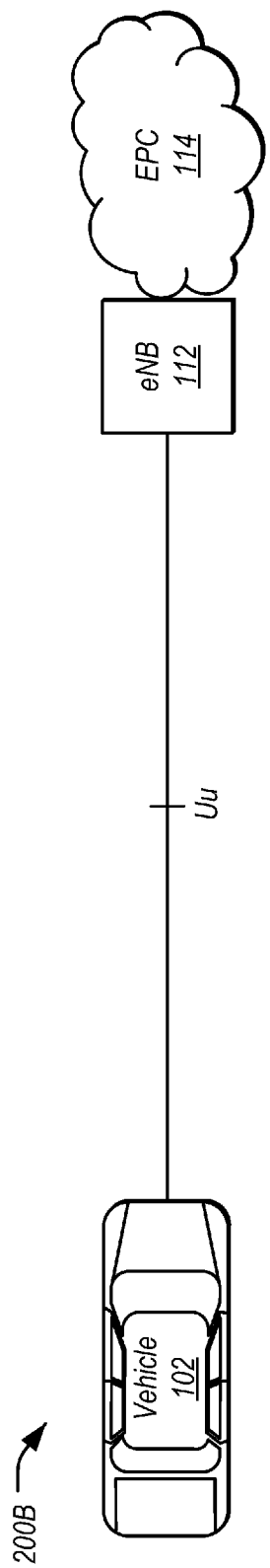
FIG. 2B illustrates an example network diagram in which a 3GPP network is directly used by a vehicle in C-V2X communication.

FIG. 2B illustrates an example network diagram 200B in which a 3GPP network is directly used by a vehicle 102 in C-V2X communication. As shown in the diagram 200B, the vehicle 102 is in communication over a Uu interface with the eNB 112 to the EPC 114 directly. Hence, as the C-V2X communication requires the EPC 114, the communication cannot start in the absence of the cellular network. Further aspects of the unavailability of C-V2X without use of 3GPP is discussed in 3GPP TS 36.523-1 titled "Evolved Universal Terrestrial Radio Access (E-UTRA) and Evolved Packet Core (EPC); User Equipment (UE) conformance specification; Part 1: Protocol conformance specification."

Figure 2C:
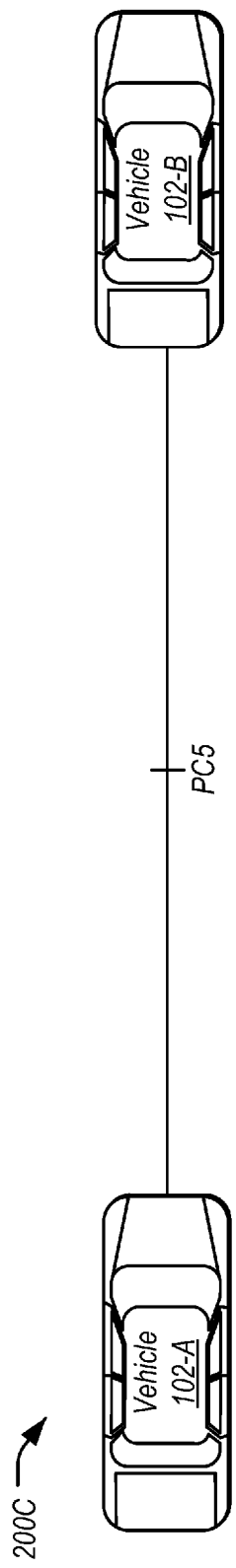
FIG. 2C illustrates an example network diagram of C-V2X communication on a PC5 interface without using a 3GPP network.

FIG. 2C illustrates an example network diagram 200C of C-V2X communication on a PC5 interface without using the 3GPP network. As shown in the diagram 200C, the vehicle 102-A is in communication over a PC5 interface with another vehicle 102-B. Accordingly, the C-V2X shown in the diagram 200C may operate in the absence of cellular network.

Figure 2D:
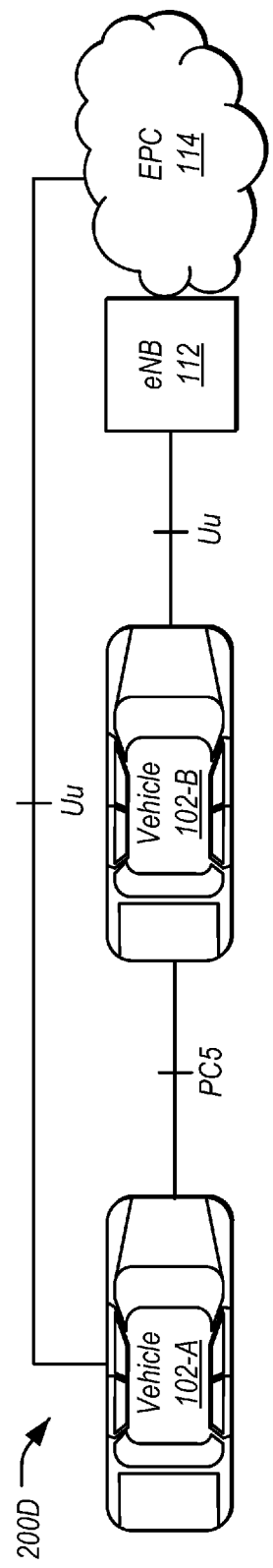
FIG. 2D illustrates an example network diagram of C-V2X communication on a PC5 interface with a parallel anchor carrier over a 3GPP network.

FIG. 2D illustrates an example network diagram 200D of C-V2X communication on a PC5 interface with a parallel anchor carrier over a 3GPP network. As shown in the diagram 200D, a vehicle 102-A is in communication over a PC5 interface with another vehicle 102-B or, in some cases, via a Uu link to the eNB 112. The PC5 link in the illustration makes no use of the 3GPP network. However, the vehicle 102-B is further configured to communicate over a parallel anchor carrier over Uu interface with the 3GPP network. For the vehicle 102-A to perform C-V2X communication, the vehicle 102-A must be authenticated by the vehicle 102-B. Hence, as the vehicle 102-B requires the EPC 114 to perform authentication, the C-V2X will start without cellular network but would soon fail to perform C-V2X communication in the absence of 3GPP network.

Notably, the scenarios described in diagrams 200A, 200B, 200C, and 200D (collectively 200) are mutually-exclusive. From a vehicle perspective, the diagram 200C may be more desirable, as in that circumstance the vehicle 102 is able to support C-V2X without dependence on the cellular network.

C-V2X system testing is standardized in technical specifications (including 3GPP TS 36.523-1 titled "Evolved Universal Terrestrial Radio Access (E-UTRA) and Evolved Packet Core (EPC); User Equipment (UE) conformance specification; Part 1: Protocol conformance specification," TS 36.523-2 titled "Evolved Universal Terrestrial Radio Access (E-UTRA) and Evolved Packet Core (EPC); User Equipment (UE) conformance specification; Part 2: Implementation Conformance Statement (ICS) proforma specification," TS 36.508 titled "Evolved Universal Terrestrial Radio Access (E-UTRA) and Evolved Packet Core (EPC); Common test environments for User Equipment (UE) conformance testing") in 3GPP standards, TS 36.521-1 titled "Evolved Universal Terrestrial Radio Access (E-UTRA); User Equipment (UE) conformance specification; Radio transmission and reception; Part 1: Conformance testing," TS 36.521-2 titled "Evolved Universal Terrestrial Radio Access (E-UTRA); User Equipment (UE) conformance specification; Radio transmission and reception; Part 2: Implementation Conformance Statement (ICS)," and TS 36.521-3 titled "Evolved Universal Terrestrial Radio Access (E-UTRA); User Equipment (UE) conformance specification; Radio transmission and reception; Part 3: Radio Resource Management (RRM) conformance testing"). Currently, these test cases are written for C-V2X communication using one of the scenarios described above in the diagrams 200. However, which test cases will apply to which scenario is not differentiated. Hence, conformance test of the vehicle modem could be erroneously done on a scenario which does not meet with C-V2X requirements of the vehicle 102. Therefore, when this vehicle modem 110 is deployed, the vehicle 102 may not perform C-V2X operations as intended.

In another implementation, prior to any C-V2X communication, the modem 110 requires service authorization by the V2X Control Function in 3GPP network [Reference 3GPP TS 23.285]. This is a requirement for all above scenarios shown in the diagrams 200. Hence, the C-V2X will not even start in the absence of a cellular network in any of the scenarios.

It is desirable to remove 3GPP network dependence for C-V2X communication. Accordingly, the above options in 3GPP standards do not meet with requirements for C-V2X communication without a 3GPP network. By removing dependence on the 3GPP network, certification testing for the modem 110 involving 3GPP network entities may be differentiated to provide provisions to ensure the scenario of diagram 300 is tested. Further, by avoiding testing of scenarios requiring use of the 3GPP network, certification costs may be reduced.

As the 3GPP network is relied upon for authentication of the vehicle modem 110, a factor for avoiding dependence on the 3GPP network is providing an alternate mechanism for C-V2X service authorization.

Figure 3:
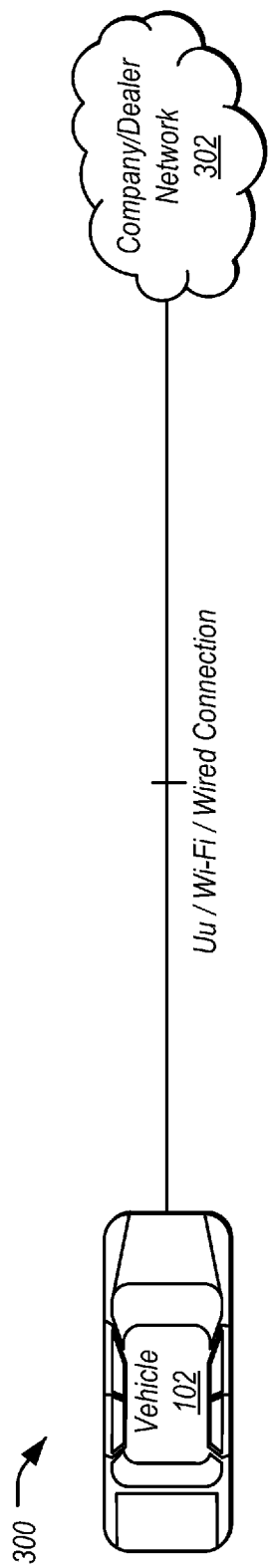
FIG. 3 illustrates an example diagram of providing authorization to a vehicle by an automobile manufacturer or dealership.

FIG. 3 illustrates an example diagram 300 of providing authorization to a vehicle 102 by an automobile manufacturer or dealership. As shown, a vehicle 102 is configured to communicate with a certification database of a company/dealer network 302 over a connection. The connection may be of various types, such as over a Uu interface, over a Wi-Fi connection, or over a wired connection to the company/dealer network 302.

The company/dealer network 302 may be a network configured for the automobile manufacturer or dealership to be capable of provisioning the vehicles 102 via the certification database. Accordingly, the dealership or manufacturer can provision the C-V2X communication for all the public land mobile networks (PLMNs) that a C-V2X vehicle 102 owner would like to have access to. The provisioning can be done on the modem 110 itself, or on another part of the TCU 108, or using a SIM/USIM/eSIM or any processor (including the TCU application processor 116, a standalone C-V2X module, a daughterboard, etc.) running software for the vehicle 102 navigation.

The TCU 108 of the vehicle 102 (or in other examples a dedicated C-V2X module) may be service-authorized by a vehicle manufacturer or other vehicle-related entity upon purchase in one or multiple Public Land Mobile Networks (PLMNs) or with help of a vehicle dealership in advance, rather than requiring use of the 3GPP network to start C-V2X communication. Accordingly, the vehicle modem 110 will not require any V2X Control Function in a 3GPP network to authorize itself for C-V2X communication. Therefore, the vehicle can perform C-V2X communication in places where there is no cellular network as well as in scenarios where the modem 110 is not subscribed to any network.

Figure 4:
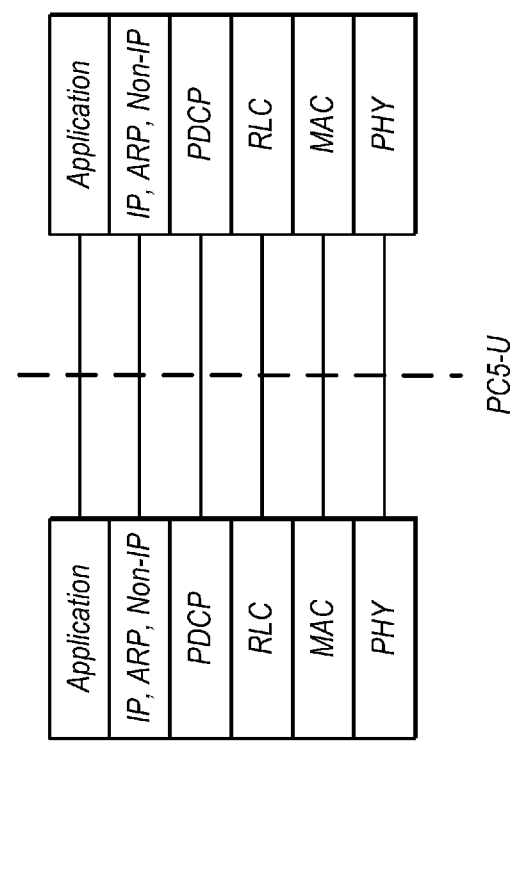
FIG. 4 illustrates an example diagram of service provisioning over an intelligent transport system (ITS) stack.

FIG. 4 illustrates an example diagram 400 of service provisioning over an intelligent transport system (ITS) stack. The ITS stack includes a physical layer (PHY) that carries information from the medium access control (MAC) transport channels over the air interface. The MAC layer is responsible for mapping between logical channels and transport channels. Above the MAC layer is the radio link control (RLC) layer, which is responsible for operations such as transfer of upper layer PDUs, error correction, concatenation, segmentation and reassembly of RLC SDUs. Above the RLC layer is the Packet Data Convergence Control (PDLC) layer, which is responsible for various tasks related to ensuring in-sequence delivery of information as well as integrity protection and verification. Above the PDLC layer are higher-level protocols such as Internet protocol (IP), Address resolution protocol (ARP), or other non IP protocols. Applications may then make use of those higher-level protocols for transmission of data.

The service provisioning may be done over the ITS stack between the C-V2X entity in the vehicle 102 and the IP, ARP or Non-IP related applications of the ITS stack entity (e.g., accessible via the company/dealer network 302). As shown, a PC5 link can be used for communication between (i) C-V2X modems as well between (ii) C-V2X modem to the Relay UE 202. Thus, provisioning of service to vehicles 102 may be performed via the PC5 link without use of the services of the cellular network.

In another aspect, independence from the 3GPP network may be accomplished by separation of the C-V2X solution scenario described in diagram 200C from the rest of C-V2X functionality for certification testing. To do so, a new Protocol Implementation Conformance Statement (PICS) may be introduced that includes only those test cases that are required to support V2V communication as shown in diagram 200C. This significantly cuts certification cost by avoiding testing of technology that is unnecessary for the vehicle modem 110. The new PICS also allows selection of the right conformance test cases from 3GPP test standards, and hence ensures correct technology testing.

The new Protocol Implementation Conformance Statement (PICS) may be similar to the PICS as defined in the TS 36.523-2 Table A.4.4-1 update in Appendix A. For instance, as discussed above with respect to FIG. 4, the new PICS may define the use of PC5 for C-V2X communication with no 3GPP network.

Hence, with the above communication and testing aspects, vehicle 102 users may be able to avoid use of data plans or other relationships with cellular operators in order to utilize C-V2X functionality of the vehicle 102. Additionally, the aforementioned aspects provide vehicle manufactures with a cost-effective solution and operation without payment of royalties to cellular OEMs operators.

Figure 5:
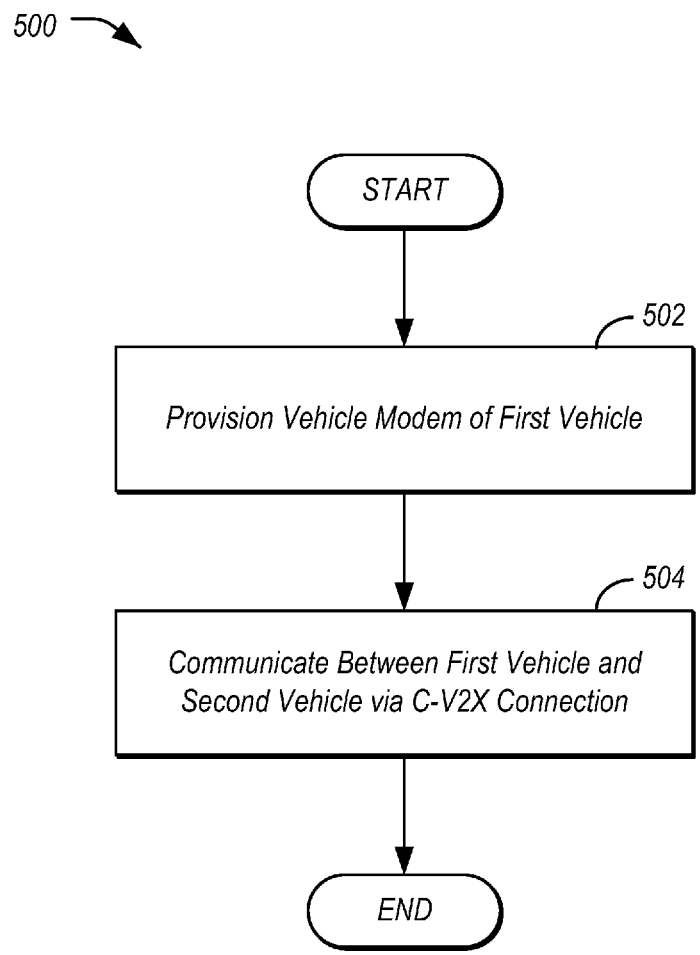
FIG. 5 illustrates an example diagram of a process for authorizing the vehicle without use of a 3GPP network.

FIG. 5 illustrates an example diagram of a process 500 for authorizing the vehicle 102 without use of the 3GPP network. At operation 502, the vehicle 102 provisions the modem 110 to perform vehicle-to-vehicle communications. This provisioning may be performed over a local network connection such as shown in the diagram 300. The local network connection may be a Uu protocol connection, a Wi-Fi connection, or a wired connection in different examples. The connection from the vehicle 102 may be to a certification database server of a manufacturer of the vehicle, or in other cases to a server of a dealership that may sell or maintain the vehicle 102. In another example, the provisioning of the modem 110 may be performed via an intelligent transport system (ITS) stack between the modem 110 and an ITS stack of a relay entity 202 connected to an ITS access network. In yet another example, the provisioning may be done via a media disk, thumb drive, or wired cable connection, etc., which communicates with the certification database for provisioning. At operation 504, once provisioned the vehicle 102 communicates with a second vehicle 102 over a direct vehicle-to-vehicle connection. Accordingly, the provisioning is performed independent of access to any cellular communications network, and no cellular connection is required.

Computing devices described herein, such as the TCU 108, generally include computer-executable instructions where the instructions may be executable by one or more computing devices such as those listed above. Computer-executable instructions, such as those of the network application 120 or V2V application 122, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a modem; and
    a processor programmed to
        provision the modem, over a local network connection of the vehicle to a server of a vehicle dealer or vehicle manufacturer of the vehicle, the server being in communication with a certification database of the dealer or manufacturer, as authenticated to perform cellular-based vehicle-to-vehicle communications over a direct cellular-based vehicle-to-vehicle connection independent of the local network connection, the provisioning being performed independent of access of the vehicle to a cellular communications network, and
        once provisioned, communicate with a second vehicle over the direct cellular-based vehicle-to-vehicle connection, the communication enabled via the provisioning.

2. The vehicle of claim 1, wherein the local network connection is a wired connection.

3. The vehicle of claim 1, wherein the local network connection is a wireless connection.

4. The vehicle of claim 1, wherein the local network connection utilizes the Uu protocol.

5. The vehicle of claim 1, wherein the processor is further programmed to provision the modem via an intelligent transport system (ITS) stack between the modem and an ITS stack of a relay entity connected to an ITS access network.

6. A method comprising:
    provisioning a modem of a vehicle, over a local network connection of the vehicle to a server of a vehicle dealer or vehicle manufacturer of the vehicle, the server being in communication with a certification database of the dealer or manufacturer, as authenticated to perform cellular-based vehicle-to-vehicle communications over a direct cellular-based vehicle-to-vehicle connection independent of the local network connection, the provisioning being performed independent of access to a cellular communications network; and
    once provisioned, communicating with a second vehicle over the direct cellular-based vehicle-to-vehicle connection, the communication enabled via the provisioning.

7. The method of claim 6, wherein the local network connection is to a server of a manufacturer of the vehicle to communicate with a certification database of the manufacturer.

8. The method of claim 6, wherein the local network connection is to a server of a vehicle dealership to communicate with a certification database of the dealership.

9. The method of claim 6, wherein the local network connection is a wired connection.

10. The method of claim 6, wherein the local network connection is a wireless connection.

11. The method of claim 6, wherein the local network connection utilizes the Uu protocol.

12. The method of claim 6, further comprising provisioning the modem via an intelligent transport system (ITS) stack between the modem and an ITS stack of a relay entity connected to an ITS access network.

13. The method of claim 6, further comprising testing the modem utilizing a Protocol Implementation Conformance Statement (PICS) separating test cases for use of a PC5 interface only, for use of a Uu interface only, and for a hybrid for use of Uu and PC5.

14. A non-transitory computer readable medium including instructions that, when executed by a processor of a controller of a vehicle including a modem, cause the controller to:
    provision the modem, over a local network connection of the vehicle to a server of a vehicle dealer or vehicle manufacturer of the vehicle, the server being in communication with a certification database of the dealer or manufacturer, as authenticated to perform cellular-based vehicle-to-vehicle communications over a direct vehicle-to-vehicle PC5 interface connection independent of the local network connection, the provisioning being performed by the dealer or manufacturer independent of access to a cellular communications network; and
    once provisioned, communicate with a second vehicle over the direct vehicle-to-vehicle PC5 interface connection.

15. The medium of claim 14, wherein the local network connection is to a server of a manufacturer of the vehicle, and the medium further comprises instructions that, when executed by the processor, cause the controller to communicate, via the server, with a certification database of the manufacturer.

16. The medium of claim 14, wherein the local network connection is to a server of a vehicle dealership, and the medium further comprises instructions that, when executed by the processor, cause the controller to communicate, via the server, with a certification database of the dealership.

17. The medium of claim 14, wherein the local network connection utilizes the Uu protocol.

18. The medium of claim 14, further comprising instructions that, when executed by the processor, cause the controller to provision the modem via an intelligent transport system (ITS) stack between the modem and an ITS stack of a relay entity connected to an ITS access network.

* * * * *